Figure 1:
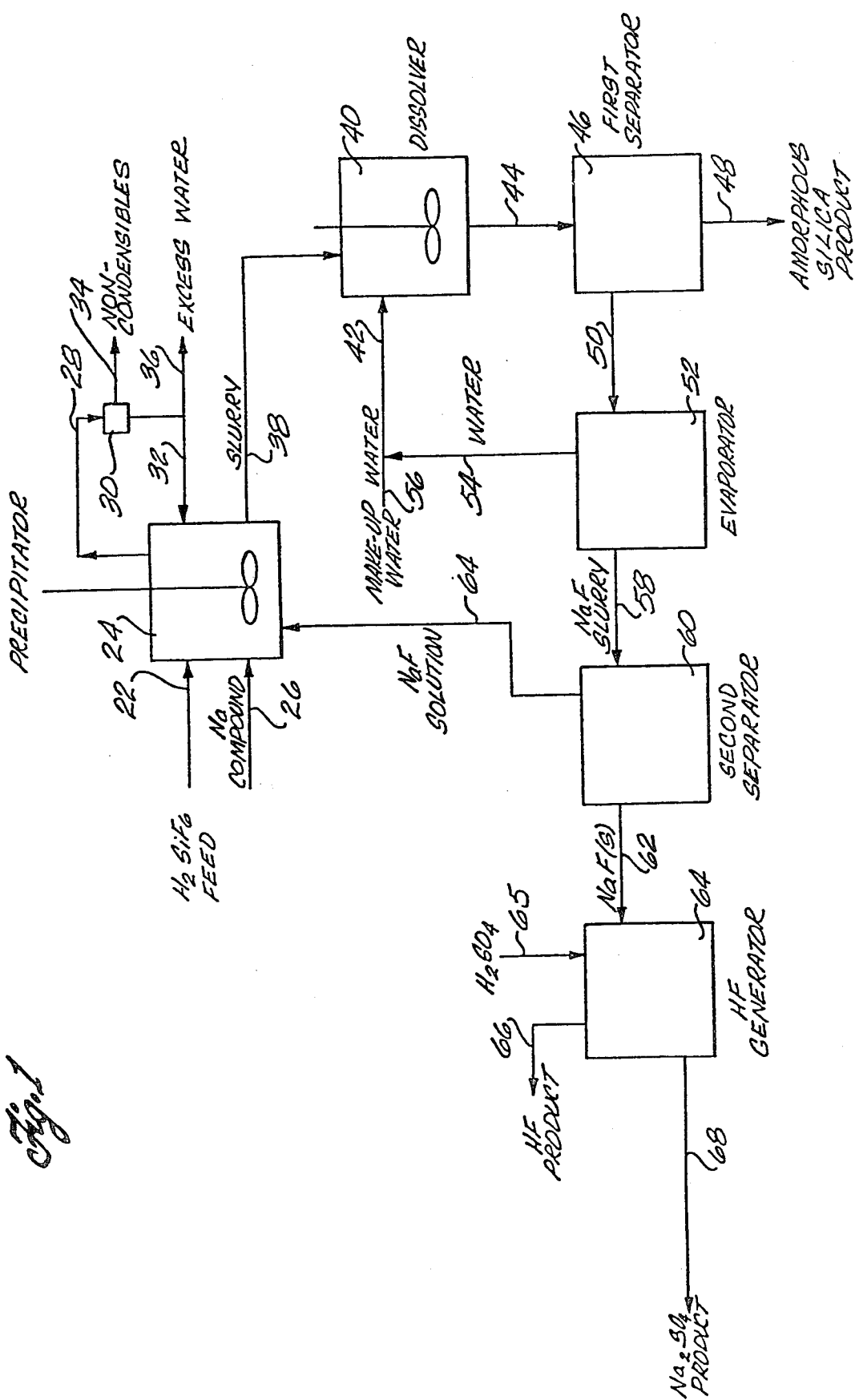

United States Patent [19]

Sikdar et al.

[11] 4,308,244
[45] Dec. 29, 1981

[54] PROCESS FOR PRODUCING FLUORINE COMPOUNDS AND AMORPHOUS SILICA

[75] Inventors: Subhas K. Sikdar, Schenectedy, N.Y.; James H. Moore, Baton Rouge, La.

[73] Assignee: Occidental Research Corp., Irvine, Calif.

[21] Appl. No.: 134,857

[22] Filed: Mar. 28, 1980

[51] Int. Cl.$^3$ .......................... C01B 33/12; C01B 7/22
[52] U.S. Cl. ................................. 423/339; 423/462; 423/465; 423/490
[58] Field of Search ............... 423/490, 470, 471, 339, 423/462, 465

[56] References Cited

U.S. PATENT DOCUMENTS

| | | | |
|---|---|---|---|
| 3,000,702 | 9/1961 | Cunningham | 423/490 |
| 3,549,317 | 12/1970 | Dorn | 423/339 |
| 3,968,197 | 7/1976 | Satoh | 423/339 |
| 4,026,997 | 5/1977 | Schneider | 423/339 |
| 4,213,951 | 7/1980 | Sikdar et al. | 423/490 |
| 4,213,952 | 7/1980 | Sikdar | 423/490 |

FOREIGN PATENT DOCUMENTS

| | | | |
|---|---|---|---|
| 40-24970 | 11/1965 | Japan | 423/490 |
| 46-11083 | 3/1971 | Japan | 423/339 |
| 53304 | 4/1967 | Poland | 423/490 |

OTHER PUBLICATIONS

Thomsen, "Acidimetric Titrations in the Fluosilicic Acid System", *Anal. Chem.*, vol. 23 (1951), pp. 973-975.

*Primary Examiner*—Brian E. Hearn
*Attorney, Agent, or Firm*—Barry A. Bisson

[57] ABSTRACT

Hydrofluoric acid and/or other fluorine compounds are recovered by reacting fluosilicic acid with a sodium-containing compound to form an alkaline aqueous slurry comprising precipitated amorphous silica and dissolved sodium fluoride. The precipitated amorphous silica is separated from the alkaline aqueous slurry leaving an aqueous solution of sodium fluoride. The sodium fluoride solution can be used as such or reacted with other substances (such as alumina, to form synthetic cryolite). Sodium fluoride is recovered from the aqueous solution (as by evaporation or extraction) and used per se or reacted with sulfuric acid to produce hydrogen fluoride.

13 Claims, 2 Drawing Figures

PROCESS FOR PRODUCING FLUORINE COMPOUNDS AND AMORPHOUS SILICA

CROSS-REFERENCES TO RELATED APPLICATIONS

This application is related to the following co-assigned and co-pending U.S. patent applications (the entire disclosures of which are incorporated herein by reference).

(1) Application Ser. No. 953,802 filed on Oct. 23, 1978, by Subhas K. Sikdar and James H. Moore, entitled "Recovery of Hydrofluoric Acid from Fluosilicic Acid with High pH Hydrolysis" (now U.S. Pat. No. 4,213,951);

(2) Application Ser. No. 953,803 filed Oct. 23, 1978 by Subhas K. Sikdar, entitled "Recovery of Hydrofluoric Acid from Fluosilicic Acid" (now abandoned);

(3) Application Ser. No. 954,066 filed on Oct. 23, 1978 by Subhas K. Sikdar entitled, "Recovery of Hydrofluoric Acid from Fluosilicic Acid with High pH Hydrolysis" (now U.S. Pat. No. 4,213,952); and (4) Application Serial No. 953,801 filed on Oct. 23, 1978 by Subhas K. Sikdar and James H. Moore, entitled "Recovery of Hydrofluoric Acid From Fluosilicic Acid" (now abandoned).

BACKGROUND

Phosphate rock contains fluorine compounds, such as fluorapatite. Beneficiated phosphate rock from Florida typically contains 3 to 4% fluorine values. Phosphoric acid can be produced from this rock by making a slurry of the rock in phosphoric acid and reacting the slurry with sulfuric acid. Part of the fluorine present in the rock is evolved as silicon tetrafluoride and gaseous hydrofluoric acid, which upon scrubbing with pond water, form a dilute fluosilicic acid. For example, U.S. Pat. Nos. 3,091,513 and 3,273,713 disclose such scrubbing. By efficient design of scrubbers, it is possible to continuously produce a solution containing about 20% fluosilicic acid. The acid solution usually contains impurities, including 1,000 to 4,000 parts per million of $P_2O_5$.

Although the solution is useful per se, as for treating municipal drinking water, it is sometimes desirable to recover the fluorine values present in the fluosilicic acid as fluoride salts and/or as anhydrous hydrofluoric acid.

Many processes have been developed for concentration of dilute fluosilicic acid solutions, and preparation of hydrofluoric acid from the concentrated fluosilicic acid. Such attempts are described in U.S. Pat. Nos. 3,645,678; 3,645,679; 3,689,216; 3,855,399; 3,278,265; 3,218,124; 3,256,061; 3,140,152; 3,914,398; 3,537,817; 3,758,674; German Offen. Nos. 2,035,300, 2,032,855, and 2,248,149; and French Pat. No. 7,034,470. However, these processes suffer from one or more disadvantages. Disadvantages of these processes include operation at excessively high temperatures or under severe conditions, use of an excessive number of processing steps, consumption of uneconomical quantities of raw materials, production of undesirable by-products, production of contaminated hydrogen fluoride, low yield of hydrogen fluoride, and considerable expenditure, both in terms of operating expense and initial capital investment. For example, U.S. Pat. Nos. 3,218,124 and 3,689,216 describe a process where fluosilicic acid solutions are treated with concentrated sulfuric acid to liberate silicon tetrafluoride and hydrogen fluoride, which are then separated. The silicon tetrafluoride is hydrolyzed to fluosilicic acid which is recycled and $SiO_2$ which is removed. Two disadvantages of this process are that a large volume of concentrated sulfuric acid is required per unit of fluosilicic acid and the splitting of the fluosilicic acid must be carried out at relatively high temperatures. This can result in severe corrosion of equipment.

U.S. Pat. No. 3,256,061 describes a process whereby fluosilicic acid is neutralized with ammonia, producing ammonium fluoride and silica. The silica is separated by filtration, and the ammonium fluoride is concentrated to a molten state constituting $NH_4F$—$NH_4HF_2$, which when treated with concentrated sulfuric acid produces hydrogen fluoride. Ammonia remains in the sulfuric acid and is sent to a phosphate acidulation unit. The chief drawbacks of this process are the requirement to recycle ammonia and the failure to remove any $P_2O_5$ impurity in the fluosilicic acid. A similar process is described in U.S. Pat. Nos. 3,914,398 and 3,537,817. U.S. Pat. No. 3,549,317 discloses reacting fluosilicic acid with calcium carbonate at a temperature of at least 50° C. to form calcium fluoride and silica. The hot CaF and silica-containing reaction mixture is then reacted with sodium hydroxide to form a calcium fluoride precipitate and a silicate solution (from which silica can be precipitated at above about 50° C. by diluting with an acid to a pH between 7 and 9. U.S. Pat. No. 3,000,702 discloses reacting fluosilicic acid at 50° C. to 90° C. with anhydrous ammonia to produce a solution of ammonium fluoride and a filterable precipitate of silica. Japan Pat. No. 46-20134 to Kureha relates to reacting sodium fluoride with sulfuric acid. U.S. Pat. No. 3,878,294 describes producing hydrogen fluoride by reacting a metal fluoride, such as calcium fluoride, with sulfuric acid. U.S. Pat. No. 3,755,532 describes reacting fluosilicic acid with sodium carbonate to form a sodium fluoride solution, which can then be acidified with sulfuric acid. U.S. Pat. No. 3,278,265 discloses reacting a metal fluoride with a gaseous mixture containing sulfur dioxide to produce hydrogen fluoride.

Therefore, there is a need for a simple, high-yield process for recovering high purity hydrogen fluoride from phosphoric acid plant process streams.

SUMMARY OF THE INVENTION

The present invention is directed to a method with the above features for recovery of hydrogen fluoride from aqueous solutions containing fluosilicic acid, such as phosphate plant process streams. According to this process, an aqueous solution containing fluosilicic acid is combined with a sodium-containing compound selected from the group consisting of sodium hydroxide, sodium carbonate, sodium silicate, and combinations thereof, for forming an alkaline aqueous slurry comprising silica and dissolved sodium fluoride. For proper control of the pH of the slurry, the preferred sodium-containing compound is sodium carbonate. To form precipitated amorphous silica by this reaction, the pH of the slurry is maintained at a value greater than 7 and up to about 9, the slurry is maintained at least saturated with sodium fluoride to provide some solid precipitated sodium fluoride and the temperature of the slurry is maintained substantially equal to its boiling point.

If the slurry contains too much precipitated sodium fluoride, the sodium fluoride is dissolved by adding water to the slurry. Then the precipitated amorphous silica is filtered from the slurry, leaving an aqueous solution of sodium fluoride. The sodium fluoride solution can be used as such (as for treating drinking water or to make synthetic cryolite, $Na_3AlF_6$) or, by adding a strong mineral acid, to make HF. Preferably the solution is concentrated and sodium fluoride can be recovered from the solution by evaporating water from the solution, thereby precipitating sodium fluoride, and separating the precipitated sodium fluoride from the remaining solution. The recovered sodium fluoride can be used per se or can be reacted with sulfuric acid to generate hydrogen fluoride.

DRAWINGS

Figure 2:
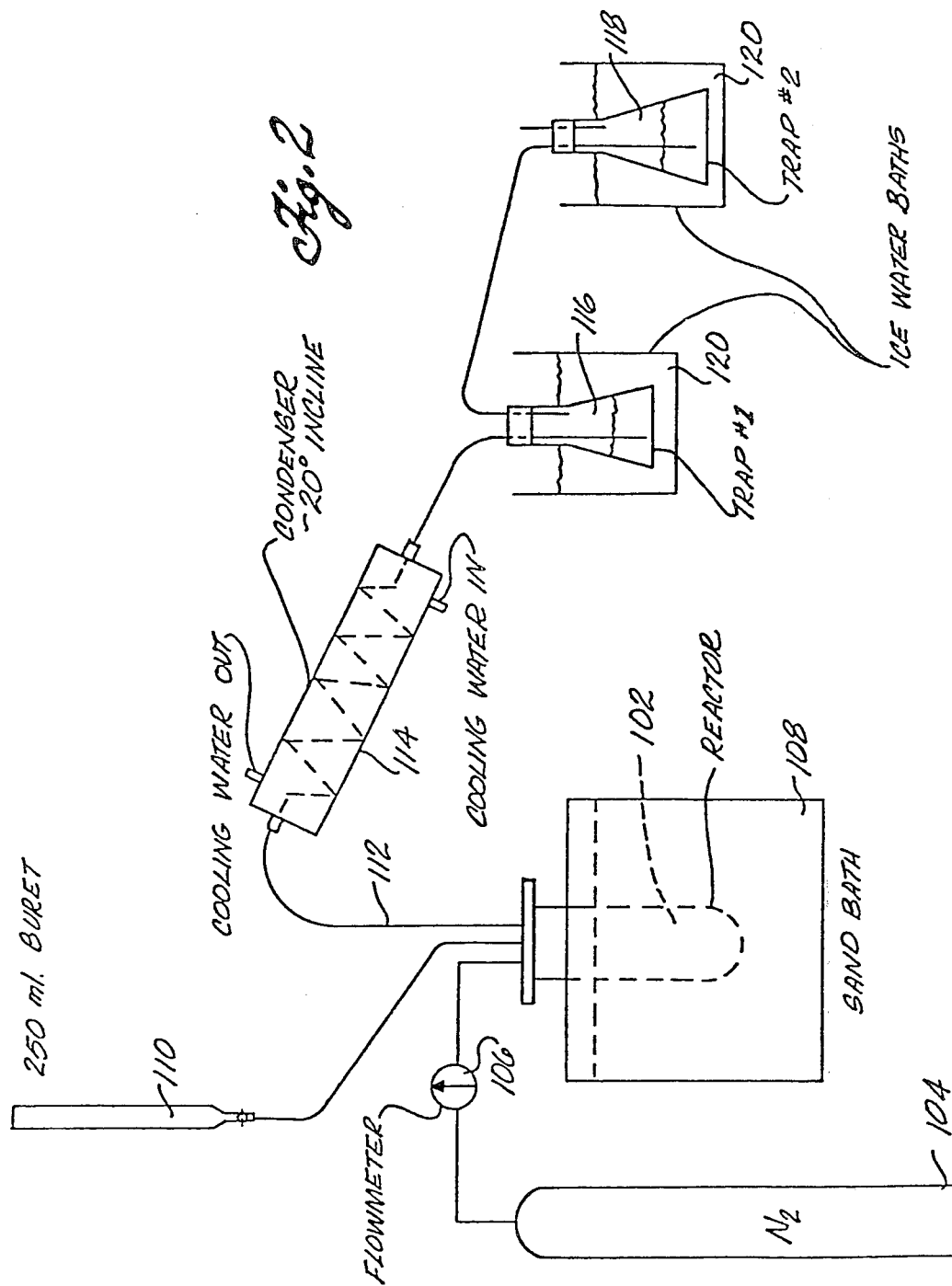

These and other features, aspects and advantages of the present invention will become more apparent upon consideration of the following description, appended claims, and accompanying drawings wherein:

FIG. 1 is a flowsheet of a process embodying features of the present invention; and FIG. 2 is a schematic drawing of equipment used for tests to demonstrate some of the advantages of the present invention.

DESCRIPTION

With reference to FIG. 1, in a process according to the present invention, a fluosilicic acid feed 22 and a sodium-containing compound selected from the group consisting of sodium hydroxide, sodium carbonate, sodium silicate, and combinations thereof 26 are combined in an agitated precipitator 24. The reaction produces an alkaline aqueous slurry comprising sodium fluoride and precipitated amorphous silica. Exemplary of the reactions which occur are the following:

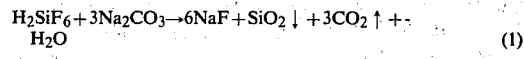

(1)

and

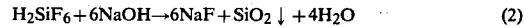

(2)

It is important that the conditions in the precipitator be maintained such that amorphous silica is formed in the precipitator, so that the silica can be separated from the sodium fluoride. If a silica gel or a silica sol is formed in the precipitator 24, then it is extremely difficult, if not impossible, to separate the silica from the sodium fluoride.

Amorphous silica is formed in the crystallizer by: (1) maintaining the pH of the alkaline aqueous slurry at a value greater than 7 and up to about 9, (2) controlling the water content of the alkaline aqueous slurry sufficiently low such that the slurry is at least saturated with sodium fluoride, and (3) maintaining the temperature of the alkaline aqueous slurry substantially equal to its boiling point. All three of these requirements must be satisfied, or else filterable, amorphous silica is not produced.

As used herein, by the term "amorphous silica" there is meant silica not having a characteristic x-ray diffraction pattern.

For example, if the pH in the crystallizer is less than 7, colloidal silica is formed, which cannot be filtered easily from sodium fluoride solution. If the pH of the alkaline aqueous slurry in the precipitator 24 is greater than or equal to 9 or less than 7, a high percentage of the formed silica is in solution, and thus cannot be separated from the sodium fluoride. Furthermore, when the pH of the slurry is less than 7, the precipitated silica is in the form of a difficult-to-filter gel.

The fluosilicic acid feed can be a phosphoric acid plant process stream such as scrubber liquor (e.g., see U.S. Pat. No. 3,091,513 and U.S. Pat. No. 3,273,713). For this process to be economical, the scrubber liquor should contain at least 15% by weight fluosilicic acid, and preferably contains at least 20% by weight fluosilicic acid. Such scrubber liquor can contain HF, and when pond water, rather than a more pure water (e.g., well water) is used, from 1,000 to 4,000 parts per million $P_2O_5$ and other phosphate impurities. Preferably the fluosilicic acid feed has few impurities because the impurities can contaminate the silica and sodium fluoride produced. It is especially important to avoid phosphate impurities if synthetic cryolite is to be made from the silica depleated sodium fluoride solution.

Because the slurry is maintained near or at its boiling point, water vapor is evolved. The water vapor as well as any other gases evolved such as carbon dioxide, are withdrawn from the precipitator via line 28. The water vapor and other gases pass to a condenser 30 in which at least a portion of the water is condensed, and refluxed via line 32 to the precipitator. Non-condensed vapors are withdrawn via line 34, and excess water, if any, is withdrawn from the system via line 36.

The precipitator is maintained under agitation to insure intimate mixing between the reactants, and to permit the precipitated silica to be withdrawn from the vessel as a portion of the slurry in line 38.

The preferred sodium-containing compound 26 to be added to the precipitator is sodium carbonate, because it has been found that by adding sodium carbonate, the pH of the slurry in the precipitator is easily controlled within the desired range. When using sodium hydroxide, it has been difficult to maintain the pH of the slurry within the desired range. In addition, sodium hydroxide, as well as sodium silicate, have a "post-precipitation" effect, where additional silica precipitates from the slurry after silica is separated from the slurry.

The sodium-containing compound preferably is added in an amount about equal to stoichiometric. The sodium-containing compound can be added as a solid, but generally is added as a 50% by weight solution in water, the concentration of the solution depending upon how much water is needed in the crystallizer to maintain the slurry saturated with sodium fluoride. The sodium fluosilicate can be added as a solid, or combined with water.

The residence time in the precipitator is that amount which is sufficient for the reaction between the sodium-containing compound and sodium fluosilicate to go to substantial completion. This takes from about 1 to about 3 hours.

Although this method has been described in terms of reacting fluosilicic acid with a sodium-containing compound, it is also useful for reacting fluosilicic acid with a potassium-containing compound, or for reacting ammonium fluosilicate with an ammonium-containing compound. In general, the precipitator can be used for reacting fluosilicic acid with a compound selected from the group consisting of MOH, $M_2CO_3$, $M_2SiO_3$, and combinations thereof, where M is selected from the group consisting of sodium, potassium, and ammonium, thereby forming an alkaline aqueous slurry comprising silica and the fluoride salt, MF. The pH of the alkaline aqueous slurry is maintained at a value greater than 7 and up to about 9, the water content of the alkaline aqueous slurry is maintained sufficiently low such that the slurry is at least saturated with the fluoride salt MF; and the temperature of the alkaline aqueous slurry is maintained substantially equal to its boiling point, so that the slurry contains precipitated amorphous silica. Although the following steps of a process according to this invention are described in terms of separating silica from a slurry containing sodium fluoride, the same steps can be used for separating amorphous silica from a slurry containing potassium fluoride or ammonium fluoride.

The slurry 38 withdrawn from the precipitator contains precipitated amorphous silica and an aqueous solution of sodium fluoride. Generally, the slurry 38 also contains precipitated sodium fluoride. This is because if the precipitator does not contain a saturated solution of sodium fluoride, amorphous silica is not formed in the precipitator. Therefore, to be sure to avoid formation of non-amorphous silica, the precipitator is conservatively operated so no sodium fluoride precipitates.

If the slurry contains precipitated sodium fluoride, it is desirable to dissolve this sodium fluoride to avoid contamination of the silica with sodium fluoride (and to avoid low yields, if hydrofluoric acid is an ultimate product of the process). Therefore, before separating the precipitated silica from the slurry 38, the slurry 38 is introduced to an agitated dissolver 40, where it is combined with water 42, which is preferably heated. Sufficient water is added to the dissolver to dissolve substantially all of the sodium fluoride. Slurry 44 containing precipitated amorphous silica and a solution of sodium fluoride is withdrawn from dissolver 40 and is introduced to a first separator 46 from which the amorphous silica 48 is withdrawn as a product. A solution of sodium fluoride 50 is withdrawn from the first separator and is passed to an evaporator 52. Alternatively, some or all of the sodium fluoride solution can be used per se as for water treatment or by adding aluminium trifluoride (or bauxite and HF or NaAlO$_2$ and CO$_2$), for conversion to synthetic cryolite for aluminium metal or, by acidification, to produce HF, etc. As noted previously, for many uses (such as water treatment, or making a synthetic cryolite) the fluosilicic acid solution feedstock must be low in P$_2$O$_5$ and other impurities, which can be accomplished by using the proper scrubbing liquid and by use of entrainment separators (e.g., as the type in U.S. Pat. No. 4,164,398) to prevent accidental contamination by wet process phosphoric acid. NaF, HF or the fluorides can be recovered by solvent extraction including liquid ion exchange (e.g., with crown ethers).

Processes for producing synthetic cryolite and other valuable products from alkali metal fluorides and aqueous solutions of such fluorides can be found, for example, in "The Chemistry and Technology of Fluorine", Interscience Publishers, Division of John Wiley, Inc. New York (1966), which is reprinted from Kirk-Othmer, "Encyclopedia of Chemical Technology", 2nd Ed., Vol. 9, p. 506-847 (1966). Of special interest are the reactions on pages 531-546.

The concentration of the sodium fluoride solution is limited by its relatively low solubility (4 gms per 100 ml H$_2$O), making it difficult to generate hydrogen fluoride by direct addition of sulfuric acid, due to the dilution penalty. The solution could be concentrated by solvent extraction with crown ethers or quaternary amines, but this involves expensive reagents. A more preferred use of the silica depleted NaF solution is to concentrate the fluoride values by precipitation, rather than extraction, to form acid grade fluorspar or synthetic cryolite, as indicated in the following reactions:

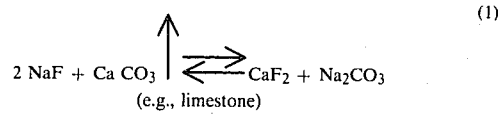

(e.g., limestone)

The by-product soda ash could be recycled to the fluosilicate decomposition step, or

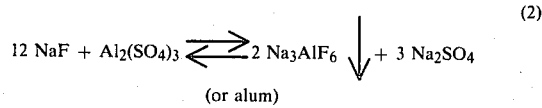

(or alum)

The by-product salt cake can be recycled to the fluosilicate precipitation step. This avoids the concentration by evaporation or extraction required to isolate sodium fluoride, and produces a solid product, easily stored readily salable.

The first separator, and all other separators described in this application, can be any suitable separation device such as a gravity sedimentation unit, a filtration unit, or a centrifuge. For example, the first separator 46 can be a cake filter, a pressure relief filter, or a vacuum drum filter.

The amorphous silica 48 produced by the process described in the above-mentioned application Ser. No. 953,803 can be of high purity, generally containing less than 2% by weight fluorine. This silica has been found to have a surface area of 37 meters squared per gram, a density of from 1.59 to 1.82 grams per cubic centimeter, a pore volume of 0.23, and a loss on ignition of from 6.7 to 7.9% by weight. The weight average particle size has been found to be from about 15 microns to about 24 microns. Therefore, the silica can be easily separated from the sodium fluoride solution by passing the slurry 44 through a filter, which should have an average pore size of less than about 15 microns. It is expected that silica produced by the process described herein will have substantially the same properties.

In the evaporator 52, water is removed from the sodium fluoride solution 50 to precipitate the sodium fluoride. This can be done under vacuum. Preferably, the removed water 54 is recycled to the dissolver 40 to provide the bulk of the water introduced to the dissolver. The remainder of the water added to the dissolver is provided by make-up water 56. The sodium fluoride slurry 58 is passed from the evaporator 52 to a second separator 60, where sodium fluoride solid 62 is recovered. Sodium fluoride solution 64 recovered from the second separator 60 can be recycled to the precipitator 24 to recover the fluorine values contained therein.

An alternative way to produce a dry, solid sodium fluoride would be by spray drying; however, crystallization is preferred where a low impurity level is desired in the solid product.

Recovered sodium fluoride can be sold as a product, or can be used to produce hydrogen fluoride in a hydrogen fluoride generator 64. In the generator 64, the sodium fluoride is combined with a stoichiometric amount of sulfuric acid 65 to produce hydrogen fluoride 66 and sodium sulfate 68. This dry process avoids formations of the well known high-boiling azeotrope with water at 38% HF.

It is important to avoid the presence of air in the generator to minimize corrosion. The sodium sulfate 68 can be withdrawn as a product. The contents of the generator 64 preferably are a paste or thick slurry, for high yield.

The sulfuric acid 65 added to the generator 64 can be 80% to 100% sulfuric acid. It has been noted that the concentration of the sulfuric acid used in this range has little, if any, effect on hydrogen fluoride yield.

Preferably a stoichiometric amount of sulfuric acid is used in the generator because it has been found that an excess of sulfuric acid reduces yield.

The higher the temperature in the generator, the higher the yield of hydrogen fluoride. However, as the temperature increases, problems with corrosion also increase. The temperature in the generator is maintained in the range of from 80° C. to 300° C., and preferably at about 200° C., for high yield with minimal corrosion.

It is preferred that the hydrogen fluoride generation reactor 64 be operated as a batch reactor to minimize corrosion problems, and to avoid leakage of sulfuric acid and/or hydrofluoric acid to the environment.

The method of this invention has many significant advantages compared to other processes available. For example, unlike most other processes described in the literature, this process does not depend upon the hydrolysis of gaseous silicon tetrafluoride. Therefore, no corrosive gases are handled until the hydrogen fluoride generation step. Thus, corrosion problems are minimized.

A further advantage of the embodiment of the present invention is that corrosion of equipment is minimized because all of the steps, except for the generation of hydrogen fluoride, are carried out at relatively low temperatures.

A further advantage of the process is the last step, where sodium sulfate is produced as a by-product. Thermodynamic analysis indicates that the reaction between sodium fluoride and sulfuric acid is highly favorable and is less endothermic than the corresponding parallel reaction between calcium fluoride and sulfuric acid.

A further advantage of the process is that the precipitated amorphous silica is usable as a by-product.

These and other advantages of the present invention will become more apparent with respect to the following examples:

EXAMPLE 1 (Reaction of Fluosilicic Acid with Sodium Carbonate)

Reagent grade 30% fluosilicic acid solution is diluted with water to make 20% fluosilicic acid and is then combined with 25% by weight sodium carbonate solution in a 250 milliliter Corning conical flask fitted with a reflux condenser cooled by tap water. The flask is placed on a hot plate and the contents of the flask are maintained at about 100° C. After three hours, the reaction mass is cooled. The reaction mass has a pH of 8.0. The reaction mass is transferred to a one-liter beaker and 900 cc of deionized water are added, with vigorous stirring at room temperature for about 10 minutes. The resultant slurry is then filtered. The filtered precipitate is a white, fine, porous powder of amorphous silica which washes well. No crystalline matter is found in the precipitate by x-ray diffraction analysis. Silica prepared by a similar reaction where sodium silicofluoride is reacted with sodium carbonate, as described in Example 4 of the above-identified application, Ser. No. 953,803, had a surface area of 37 meters square per gram, a density of 1.82 grams per cubic centimeter, a pore volume of 0.23, a loss on ignition of 7.9% by weight, and a weight average particle size of about 15 microns.

EXAMPLE 2 (Evaporation of Water From Sodium Fluoride Solution)

One thousand grams of saturated sodium fluoride solution are introduced to an evaporator. Five hundred grams of water are evaporated from the solution, thereby producing 27.5 grams of solid sodium fluoride.

EXAMPLE 3 (Evaporation of Water From Solution Fluoride Solution)

Five hundred cubic centimeters of filtrate containing sodium fluoride were introduced to an evaporator maintained at a temperature of 100° C. 285 cc of water vapor were removed, producing 7.7 grams of solid sodium fluoride and 215 cc of liquor saturated with sodium fluoride. This example shows one way that both solid sodium fluoride and a concentrated solution can be produced.

EXAMPLE 4 (HF Generation)

These tests were conducted to show the feasibility of producing hydrogen fluoride from sodium fluoride. FIG. 2 shows a schematic of the experimental equipment used. Forty-two grams of sodium fluoride were pre-heated to a desired temperature in a Monel reactor 102. Nitrogen gas was passed from storage tank 104 through a flowmeter 106 into the reactor 102 to drive out any oxygen present to avoid corrosion problems. The reactor was in a sand bath 108 to maintain the desired reactor temperature. After purging the nitrogen, sulfuric acid was introduced quickly into the reactor 102 from a buret 110. The reaction started immediately as evidenced by a large (sometimes 40° C.) drop in temperature. The product gas was led via line 112 to a water-cooled Monel condenser 114 into two serially connected caustic soda traps 116 and 118 kept in ice water baths 120. The first trap 116 contained a 20% solution of sodium hydroxide and the second trap 118 contained a 10% solution of sodium hydroxide. In the traps, the hydrogen fluoride reacted with the sodium hydroxide to produce sodium fluoride, which precipitated. About 5 minutes after the sulfuric acid addition, the nitrogen gas flow was resumed. The nitrogen gas assisted in carrying HF from the reactor.

The sodium fluoride formed in the traps was filtered, washed with water and reagent alcohol, dried and weighed. At the completion of the reaction period, the contents of the reactor 102 were dissolved in water and analyses were conducted for sulfate and fluoride ions.

Eight tests were conducted. The reaction temperature, time of reaction, concentration of sulfuric acid, percent excess of sulfuric acid, flow rate of nitrogen, and yield for each test is presented in Table 1.

The results of the test were analyzed according to the Yate's method. Based on this analysis, the following conclusions were reached:

1. Flow of nitrogen did not have any influence on yield.

2. Time was not significant with regard to yield. This indicates that no further reaction takes place after the first hour of reaction since yield obtained was always less than 100%. This also indicates that diffusion limits the reaction. Therefore, some form of mixing should be used to increase yield.

3. The strength of the sulfuric acid appears to have no influence on yield, i.e. 80% sulfuric acid seems to produce the same yield as 96.5% sulfuric acid.

4. Excess sulfuric acid appears to decrease yield.

TABLE 1

| Reaction Test | Reaction (°C.) | Reaction Time (HR) | H$_2$SO$_4$ Concentration (% wt) | % Excess H$_2$SO$_4$ | N$_2$ Rate (Standard cc/min) | Yield (% by Weight) |
|---|---|---|---|---|---|---|
| 4A | 150 | 1 | 80 | 0 | 100 | 23.7 |
| 4B | 200 | 1 | 80 | 2 | 100 | 32.9 |
| 4C | 150 | 2 | 80 | 2 | 300 | 18.9 |
| 4D | 200 | 2 | 80 | 0 | 300 | 49.9 |
| 4E | 150 | 1 | 95 | 2 | 300 | 24.2 |
| 4F | 200 | 1 | 95 | 0 | 300 | 41.1 |
| 4G | 150 | 2 | 95 | 0 | 100 | 33.6 |
| 4H | 200 | 2 | 95 | 2 | 100 | 40.2 |

5. Temperature is by far the most important variable affecting yield, with higher temperatures increasing yield.

EXAMPLE 5 (HF Generation)

In one set of two experiments either of 80% or 96.5% H$_2$SO$_4$ at 100% excess was used. The reaction mixture was prepared at 0° C. in an ice bath and then the reactor was assembled. The heating then was started and nitrogen flow was turned on. A final temperature of about 160° C. was obtained after about five (5) hours. The yield with 80% H$_2$SO$_4$ was 83.3% while that with 96.5% was 78%.

EXAMPLE 6 (HF Generation)

In a variation of Example 5, a condensor was mounted vertically on the reactor to act as a reflux condenser. Thus only HF was allowed to leave the reactor. Severe corrosion resulted. Nevertheless the yield was consistently around 80%.

EXAMPLE 7 (HF Generation)

An attempt was made to reach stoichiometric yield. A platinum crucible was used to effect the reaction. The yield was calculated from F analysis of the solution made by dissolving the solid residue in a definite quantity of water. Two experiments were carried out. The yields were 95.6 and 97.4%.

Based on the tests with generation of hydrogen fluoride from sulfuric acid and sodium fluoride, it was concluded that corrosion can limit the extent of reaction and mixing of the reactants can improve yield.

It can be seen from the foregoing description that one advantage of the present invention is that a sodium fluoride solution can be produced from fluosilicic acid, which is relatively free from silica. This sodium fluoride solution can be used as such (or can be further concentrated, and used) or the solution (or a further, concentrated solution) can be reacted with other materials to produce valuable products (e.g., aluminum fluoride can be added, or alumina and hydrofluoric acid, to produce a solid, synthetic cryolite, which can be recovered as by filtration, and, ultimately converted to aluminum).

Alternatively, the sodium fluoride solution can be concentrated, as by evaporation, to crystallize out relatively pure sodium fluoride (and produce a saturated sodium fluoride solution) or, the solution can be evaporated to dryness (as by spray-drying) to produce solid sodium fluoride (which can, if desired, then be converted to HF or other fluorides).

Another alternative is to recover HF or sodium fluoride (or other fluorides) from the silica-depleted solution by solvent extraction or liquid ion exchange.

Also, a strong mineral acid can be added to the silica-depleted sodium fluoride solution to produce HF, which can be recovered by distillation and/or by solvent extraction, as with an amine (see Hardwick, W. H. and Wace, P. F. "Hydrofluoric Acid Recovery by Amine Solvent Extraction", (C and P. E. June 1965, pages 283–293).

Note that at page 293, Hardwick and Wace indicate that silica contamination in aqueous HF causes problems when extracting HF with an amine. The present invention provides a way to improve the amine extraction by reducing the content of silica in aqueous HF produced by acidification of sodium or other alkali metal fluorides produced from fluosilicic acid or from sodium containing scrub liquids.

One means of practicing the present invention is to scrub vapors from wet-process phosphoric acid production (including evaporator vapors and vapors from the reactors, such as those in U.S. Pat. No. 4,132,760) with dilute aqueous caustic and/or sodium carbonate or other alkali metal base to produce an acidic solution comprising fluosilicic and alkali metal (e.g., sodium) compounds and to further process this alkali metal fluosilicic acid solution by the process described herein. When such alkali-metal base-scrubbing is used, it is important to control the amount of the base such that no silica gel forms in the scubber (e.g., the pH of the final solution should be no greater than about 2).

Another use for the silica depleated, sodium fluoride solution is to add calcium carbonate and/or calcium hydroxide to precipitate calcium fluoride (e.g., an artificial fluorospar) which can then be separated from the resulting sodium hydroxide solution and then converted into HF by contact with sulfuric acid (oleum). The byproduct calcium sulfate can be used in gypsum products and the alkali sodium base solution can be recycled to react with the fluosilicic acid solution. This embodiment is a co-invention with John David Ellis per James Bradford.

Although this process has been described in considerable detail with reference to certain versions thereof, other versions are possible. Therefore, the spirit and scope of the appended claims should not be limited to the description of the preferred versions contained herein.

What is claimed is:

1. A process consisting essentially of the steps of:
   (a) reacting in a precipitation zone fluosilicic acid in aqueous solution with a sodium-containing compound selected from the group consisting of sodium hydroxide, sodium carbonate, sodium silicate and combinations thereof, to form an alkaline aqueous slurry comprising silica and dissolved sodium fluoride; by maintaining during said reaction the pH of the alkaline aqueous slurry at a value greater than 7 and up to about 9, the alkaline aqueous slurry at least about saturated with sodium fluoride, and the temperature of the alkaline aqueous slurry substantially equal to its boiling point so that an amorphous silica precipitate is formed; and
   (b) separating precipitated amorphous silica from the alkaline aqueous slurry leaving an aqueous solution comprising sodium fluoride.

2. The process of claim 1 in which the alkaline aqueous slurry contains precipitated sodium fluoride, and water is added to the alkaline aqueous slurry, in a dissolving zone, to dissolve substantially all of the precipitated sodium fluoride before the precipitated amorphous silica is separated from the alkaline aqueous slurry.

3. The process of claim 1 wherein said separating in step (b) is effected by filtering said slurry and the filtrate comprises said aqueous solution comprising sodium fluoride.

4. The process of claim 3 further comprising recovering solid sodium fluoride from said filtrate.

5. The process of claim 1 in which solid sodium fluoride is recovered from the filtrate comprising an aqueous solution of sodium fluoride by a process comprising
(i) evaporating water from the filtrate in an evaporation zone to form an aqueous slurry comprising solid sodium fluoride and a solution which is saturated with respect to sodium fluoride;
(ii) filtering at least a portion of the slurry to recover solid sodium fluoride and a filtrate comprising a solution which is saturated with respect to sodium fluoride; and
(iii) converting said solution which is saturated with respect to sodium fluoride into fluoride compounds by reaction with another chemical substance.

6. The process of claim 3 wherein an aluminum compound is added to said filtrate and converted into a solid, synthetic cryolite.

7. The process of claim 6 wherein said compound is $AlF_3$.

8. The process of claim 1 in which the precipitated amorphous silica is separated from the alkaline aqueous slurry by filtering the slurry through a filter having an average pore size less than about 15 microns.

9. The process of claim 1 in which at least 50% by weight of the separated amorphous silica has a diameter greater than about 15 microns.

10. A process for recovering solid amorphous silica from fluosilicic acid consisting essentially of the steps of:
(a) reacting fluosilicic acid with a material selected from the group consisting of MOH, $M_2CO_3$, $M_2SiO_3$, and combinations thereof, where M is selected from the group consisting of sodium, potassium, and ammonium, to form an alkaline aqueous slurry comprising silica and a dissolved fluoride salt MF; wherein during said reacting the pH of the alkaline aqueous slurry is maintained at a value greater than 7 and up to about 9, the water content of the alkaline aqueous slurry is maintained sufficiently low such that the slurry is at least about saturated with respect to the fluoride salt, and the temperature of the alkaline aqueous slurry is maintained at its boiling point so that an amorphous silica precipitate is formed; and
(b) separating precipitated amorphous silica from the alkaline aqueous slurry.

11. A process for recovering a low silica content fluoride solution and solid amorphous silica from phosphate plant scrub liquor containing at least about 15% by weight fluosilicic acid, consisting essentially of the steps of:
(a) combining the scrub liquor with sodium carbonate in a precipitation zone to form an alkaline aqueous slurry comprising precipitated amorphous silica and sodium fluoride by maintaining the pH of the alkaline aqueous slurry at a value greater than 7 and up to about 9, the water content of the alkaline aqueous slurry sufficiently low such that the slurry contains solid sodium fluoride, and the temperature of the alkaline aqueous slurry substantially equal to its boiling point;
(b) adding sufficient water to the alkaline aqueous slurry in a dissolving zone to dissolve substantially all of the solid sodium fluoride; and thereafter
(c) separating precipitated amorphous silica from the alkaline aqueous slurry leaving an aqueous solution comprising sodium fluoride.

12. A process for recovering solid amorphous silica from fluosilicic acid consisting essentially of the steps of:
(a) reacting fluosilicic acid with MOH, where M is selected from the group consisting of sodium and potassium to form an alkaline aqueous slurry comprising silica and a dissolved fluoride salt MF; wherein during said reacting the pH of the alkaline aqueous slurry is maintained at a value greater than 7 and up to about 9, the water content of the alkaline aqueous slurry is maintained sufficiently low such that the slurry is at least about saturated with respect to the fluoride salt, and the temperature of the alkaline aqueous slurry is maintained substantially equal to its boiling point so that an amorphous silica precipitate is formed; and
(b) separating precipitated amorphous silica from the alkaline aqueous slurry.

13. A process for recovering solid amorphous silica from fluosilicic acid consisting essentially of the steps of:
(a) reacting fluosilicic acid with a material selected from the group consisting of $M_2CO_3$, $M_2SiO_3$, $M_2CO_3$, $M_2CO_3$ and $M_2SiO_3$ and combinations thereof with MOH, where M is selected from the group consisting of sodium, potassium, and ammonium, to form an alkaline aqueous slurry comprising silica and a dissolved fluoride salt MF; wherein during said reacting the pH of the alkaline aqueous slurry is maintained at a value greater than 7 and up to about 9, the water content of the alkaline aqueous slurry is maintained sufficiently low such that the slurry is at least about saturated with respect to the fluoride salt, and the temperature of the alkaline aqueous slurry is maintained at its boiling point so that an amorphous silica precipitate is formed; and
(b) separating precipitated amorphous silica from the alkaline aqueous slurry.

* * * * *